United States Patent [19]
Beers et al.

[11] Patent Number: 5,568,064
[45] Date of Patent: Oct. 22, 1996

[54] BIDIRECTIONAL TRANSMISSION LINE DRIVER/RECEIVER

[75] Inventors: Gregory E. Beers; Richard F. Frankeny, both of Austin; Mithkal M. Smadi, Round Rock, all of Tex.

[73] Assignee: International Business Machines Corporation, Armonk, N.Y.

[21] Appl. No.: 438,134

[22] Filed: May 8, 1995

Related U.S. Application Data

[63] Continuation-in-part of Ser. No. 376,708, Jan. 23, 1995.
[51] Int. Cl.$^6$ .............................................. H03K 19/0175
[52] U.S. Cl. .................................. 326/31; 326/30; 326/34
[58] Field of Search ................................. 326/30–31, 34, 326/86; 375/7

[56] References Cited

U.S. PATENT DOCUMENTS

| | | | |
|---|---|---|---|
| 4,604,740 | 8/1986 | Gandini et al. | |
| 4,638,473 | 1/1987 | Cooperman et al. | |
| 4,698,800 | 10/1987 | Cavaliere et al. | |
| 4,703,198 | 10/1987 | Porter et al. | |
| 4,713,827 | 12/1987 | Lauffer et al. | |
| 4,756,006 | 7/1988 | Rickard | |
| 4,859,877 | 8/1989 | Cooperman et al. | 326/86 X |
| 5,030,855 | 7/1991 | Leung | |
| 5,095,231 | 3/1992 | Sartori et al. | 326/30 |
| 5,107,230 | 4/1992 | King | 326/30 X |
| 5,111,080 | 5/1992 | Mizukami et al. | 326/30 |
| 5,134,311 | 7/1992 | Biber et al. | 326/30 X |
| 5,216,667 | 7/1993 | Chu et al. | |
| 5,260,612 | 11/1993 | Lehmann et al. | |
| 5,382,841 | 1/1995 | Feldbaumer | 326/30 |
| 5,466,975 | 11/1995 | Wratten | 326/30 X |
| 5,481,207 | 1/1996 | Crafts | 326/30 X |

FOREIGN PATENT DOCUMENTS

0504063A1  3/1992  France .

OTHER PUBLICATIONS

IBM Tech Disc Bull V. 11, No. 7, Dec. 1968, Simultaneous Bidirectional Baseband Data Transmission.
IBM Tech Disc Bull V. 18, No. 9, Feb. 1976, Bidirectional Communications Within a Binary Switching System.
IBM Tech Disc Bull V. 22, No. 11, Apr. 1980, Component Mismatch Accommodation for Bidirectional Chip to Chip Communication.

(List continued on next page.)

*Primary Examiner*—David R. Hudspeth
*Attorney, Agent, or Firm*—Clark Thomas & Winters

[57] ABSTRACT

A method and apparatus are disclosed for sending and receiving logic signals responsive to external digital data input and control signals. A reference circuit providing a first and second reference signal is common to the signal generating and receiving circuitry. The signal generating circuitry includes a signal source connected to the transmission line for generating a variable level digital signal, and a reference level adjusting and switching circuit ("RLA/S circuit") which is responsive to the digital data input and the first reference signal. The RLA/S circuit is connected to the signal source for selecting the level of the variable level digital signal and providing a switching signal. The signal source output is thus adjusted and switched so that the signal source generates a digital signal to the transmission line which follows the digital data input at the selected output signal level. The signal receiving circuitry includes a variable input impedance circuit connected to the transmission line which is responsive to the second reference signal for receiving variable level digital signals from the transmission line. It also includes a detecting circuit connected to receive the variable level digital signals from the variable input impedance circuit. The detecting circuit is responsive to the first reference signal and detects logic states of the variable level digital signals as determined by the first reference signal. The detecting circuit also converts the detected logic states into corresponding logic signals of predetermined output levels.

19 Claims, 9 Drawing Sheets

OTHER PUBLICATIONS

IBM Tech Disc Bull V. 23, No. 4, Sep. 1980, Simultaneous Bidirectional Transceiver Circuit.

IBM Tech Disc Bull V. 30, No. 3, Aug. 1987, Failure–Tolerant Self–Testing Driver/Receiver.

Proceedings—IEEE Internat'l Conf on Computer Design: VLSI in Computers and Processors (1990), pp. 430–433, Simultaneous Bidirectional Signaling for IC Systems, Kevin Lam, Larry R. Dennison and William J. Dally—Dept. of Elec Eng & Comp Sci, MIT, Cambridge MA.

BIDIRECTIONAL TRANSMISSION LINE DRIVER/RECEIVER

CROSS-REFERENCE TO RELATED APPLICATION

This application is a continuation-in-part of co-pending application Ser. No. 08/376,708 filed Jan. 23, 1995, for a Bidirectional Transmission Line Driver/Receiver.

BACKGROUND OF THE INVENTION

1. Field of the Invention

A transmission line transceiver is disclosed. More particularly, a transmission line transceiver having an active transmission line terminator and variable level signal source is disclosed which is well adapted for simultaneous bidirectional operation.

2. Description of Related Art

As the operating speed of computer processors continues to increase, additional demands are placed on devices that must send and receive logic signals.

In measuring high frequency signals, the measurement sample rates are, of course, higher than in measuring lower frequency signals. Measuring the precise magnitude of a signal at high sample rates is more difficult than at lower rates because transient conditions, which may not have any appreciable effect within the relatively long time period of a lower frequency sample rate, may have a significant effect in the shorter period of a high frequency sample rate.

One high frequency effect of particular concern in the present invention is that of signal reflection, which occurs when the impedance of a communication path does not match the impedance of a terminating load on the receiving end of the path. (The communication path between a sending and a receiving device includes a path such as a buss between devices on a single circuit board or a cable between devices on different boards. In any case, because the present invention concerns relatively high frequency signals which require a consideration of transmission line effects, the communication path may be referred to herein as a transmission line.) Ideally, a terminating load will sink a transmitted signal immediately upon the signal arriving at the load so that the magnitude of the signal may be sampled immediately upon its arrival at the load and a precise value of the signal magnitude may be determined from the sample. However, if the terminating load does not match the transmission line impedance, then the load will sink only a portion of the signal upon the signal's initial arrival. The remaining portion of the signal will be reflected back onto the transmission line. Typically, depending upon a number of factors, at least a part of this reflected portion of the signal will ultimately be reflected from other loads on the transmission line back to the terminating load., and this reflection back and forth among loads on the line will repeat, until eventually more and more of the signal will sink through the terminating load.

The effect of this signal reflection is, at best, to delay the time at which the signal may be accurately sampled until such time as the signal has gone through perhaps many cycles of reflection on the transmission line. At worst, in the case where a significant part of the reflected portion is dissipated in the transmission line itself, or sinks in other loads on the transmission line, the effect of this reflection is to greatly reduce the precision with which the magnitude of the signal can be measured, perhaps to the point where the logic value of a signal cannot be accurately determined at all. Therefore, it is advantageous to eliminate, or at least greatly reduce, signal reflection by matching, insofar as possible, the impedance of a terminating load and that of a transmission line.

It is well known to send multivalued logic signals from a sending device to a receiving device in order to facilitate simultaneous bidirectional transmission. For a multi-valued logic signal, a receiver must be more discriminating than a receiver that merely detects an on condition and an off condition. That is, a receiver for multi-value logic signals must measure the magnitude of a received signal with a relatively higher degree of precision than a receiver that must merely detect the presence or absence of a signal. Thus, there is even greater incentive for impedance matching for high frequency signals which are multi-valued.

While it is relatively straightforward and economical to manufacture a transmission line between devices with tight control of the line impedance, it is not as simple to economically manufacture a fixed terminating load within tight impedance limits. Therefore, an object of the present invention is to actively adjust termination impedance and logic signal current during operation to eliminate or greatly reduce signal reflection using components which may be manufactured economically.

Impedance matching using active devices could be achieved by providing, in addition to the transmission signal, a first signal over a first reference line from a sender to a receiver informing the receiver of the amplitude for a logic signal, and a second signal over a second reference line from a receiver to a sender informing the sender of the impedance of a transmission line terminator in the receiver. However, particularly where a number of senders and receivers are interconnected on the transmission line, this arrangement is disadvantageous because of the number of reference lines required. Therefore, another object of the invention is to minimize signal reflection with a single reference line between devices on the transmission line.

SUMMARY OF THE INVENTION

In the present embodiment of the invention, a sending device (driver) and a receiving device are interconnected by a transmission line with a certain characteristic impedance for communicating logic signals over the transmission line between the devices. The driver has a source for sending the logic signals, and a reference generator connected to the source for setting the magnitude of the signals sent by the source. The receiver has a transmission line terminator for sinking the signals, and a reference generator connected to the terminator for setting a bias of the terminator to establish a certain family of terminator impedances for sinking the signals. The driver reference generator and the receiver reference generator interactively match the terminator impedance to the transmission line for the set magnitude of the signals.

In further aspects of the invention, the sending and receiving device circuitry for generating and receiving digital signals over a transmission line is responsive to externally generated digital data input and control signals. A reference circuit providing a first and second reference signal is common to the signal generating and receiving circuitry.

The signal generating circuitry includes a signal source connected to the transmission line for generating a variable level digital signal, and a reference level adjusting and switching circuit ("RLA/S circuit") which is responsive to the digital data input and the first reference signal. The RLA/S circuit is connected to the signal source for selecting the level of the variable level digital signal and providing a switching signal. The signal source output is thus adjusted and switched so that the signal source generates a digital signal to the transmission line which follows the digital data input at the selected output signal level.

The signal receiving circuitry includes a variable input impedance circuit connected to the transmission line which is responsive to the second reference signal for receiving variable level digital signals from the transmission line. It also includes a detecting circuit connected to receive the variable level digital signals from the variable input impedance circuit. The detecting circuit is responsive to the first reference signal and detects logic states of the variable level digital signals as determined by the first reference signal. The detecting circuit also converts the detected logic states into corresponding logic signals of predetermined output levels.

In further aspects of the signal generating circuitry, the RLA/S circuit speeds up switching of the signal source while maintaining the signal source digital output signal at a level not exceeding that set by the first reference signal. That is, in generating the digital output signal the signal source switches between a first and second output state, the switching speed of the signal source being dependent upon the level of the switching signal applied to the signal source, and during an initial switching stage a level of the switching signal provided to the signal source by the RLA/S circuit is boosted to a level greater than that set by the first reference signal so that the switching circuit increases the switching speed of the signal source. Then, following the initial switching stage, the level of the switching signal conforms to the first reference signal so that the signal source digital output signal does not exceed the level set by the first reference signal.

In still further aspects of the signal generating circuitry, an output level override circuit is included. The override circuit is connected to the RLA/S circuit, and, in response to the digital control signal, overrides the selected output signal level set by the first reference adjustment signal so that the output signal is instead set at a certain predetermined maximum level.

In further aspects of the invention, the common reference circuit also provides a third reference signal, and the signal receiving circuitry further includes a fixed input impedance circuit connected to the transmission line for receiving the variable level digital signals from the transmission line. In connection with the fixed impedance circuitry, a second detecting circuit is connected to receive the variable level digital signals from the transmission line. The second detecting circuit is responsive to the first and third reference signals, and detects logic states of the variable level digital signals as determined by the first and third reference signals. The second detecting circuit also converts the detected logic states into corresponding logic signals of predetermined output levels.

In still further aspects of the receiving circuitry, in response to one of the external control signals the variable input impedance circuit assumes a disabled mode having a high input impedance so that the transmission line is unloaded.

Still other objects and advantages of the present invention will become readily apparent to those skilled in this art from the following detailed description. The preferred embodiment of the invention is shown by way of illustration of the best mode contemplated for carrying out the invention. Other embodiments are possible and the details may be modified in various respects without departing from the invention. For example, voltages could be used for logic signals instead of currents. As another example, a field effect transistor ("FET") is selected as a terminator for the transmission line. Bipolar devices could also be selected. Also, while a shielded reference line and transmission line are shown, non-shielded lines may also be suitable. Accordingly, the drawing and description are to be regarded as illustrative in nature, and not restrictive.

DESCRIPTION OF THE PREFERRED EMBODIMENT

Overview of Operation

Figure 1:
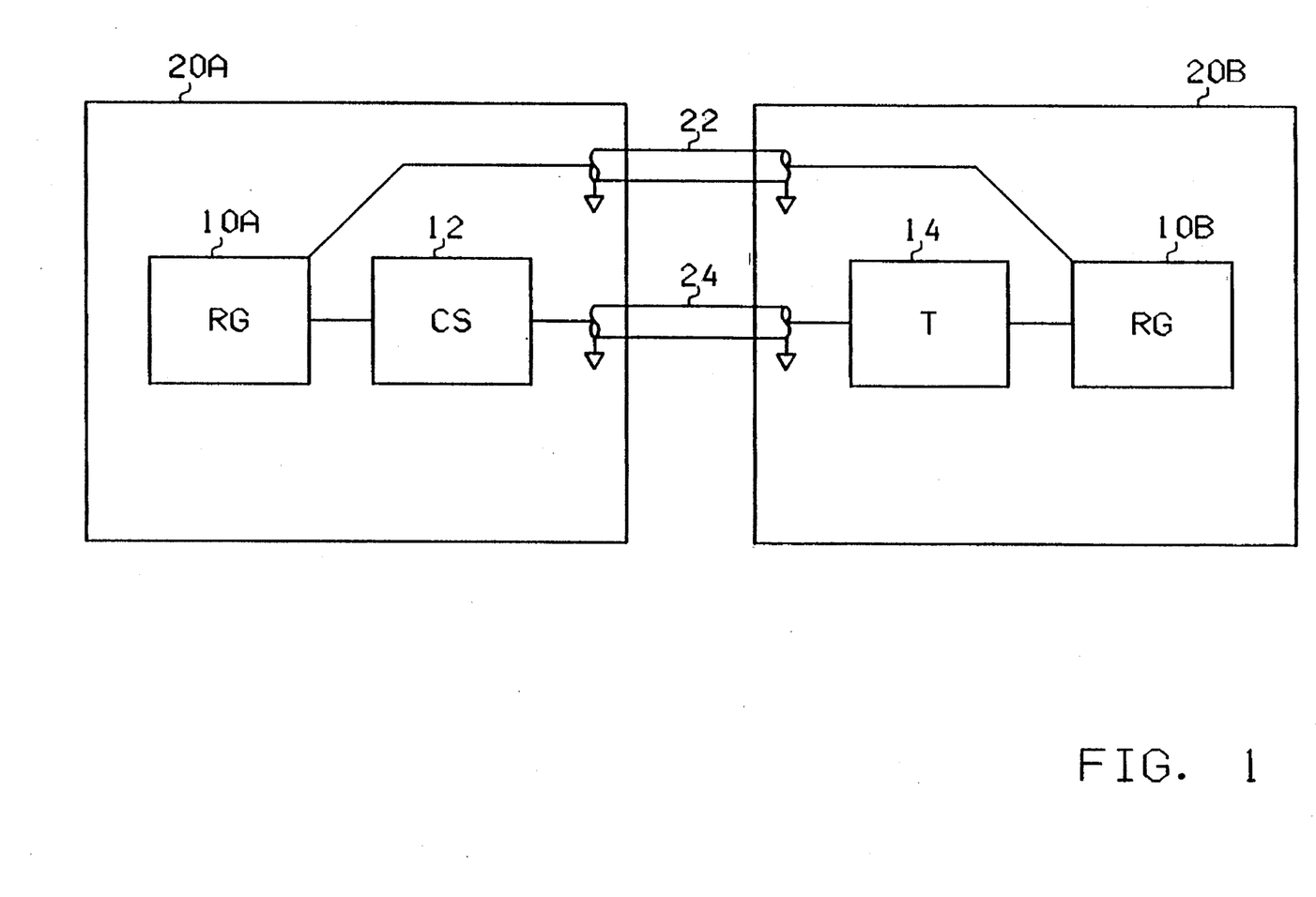
FIG. 1 is a block diagram of a driver interconnected by a transmission line to a receiver.

The block diagram of FIG. 1 shows a driver 20A with a reference generator 10A providing a reference signal to a current source 12. The current source is connected to one end of a transmission line 24 having a predetermined impedance. At the other end of the transmission line 24 is a second driver 20B with its own reference generator 10B providing a reference signal to an active terminator 14. The reference generators 10A and 10B are interconnected by a reference line 22. The driver 20A reference generator 10A reference signal to the current source 12 sets a certain magnitude for a current signal which the current source 12 sends to the receiver 20B over the transmission line 24. The receiver 20B reference generator 10B reference signal to the terminator 14 sets a family of impedances for the termination of the transmission line 24 at the transmission line terminator 14 such that for the current signal magnitude set by the driver reference generator 10A the terminator 14 impedance matches the impedance of the transmission line 24. The reference generators 10A and 10B set the impedance family and the current magnitude interactively and continuously using the feedback path of the reference line 22.

Figure 2:
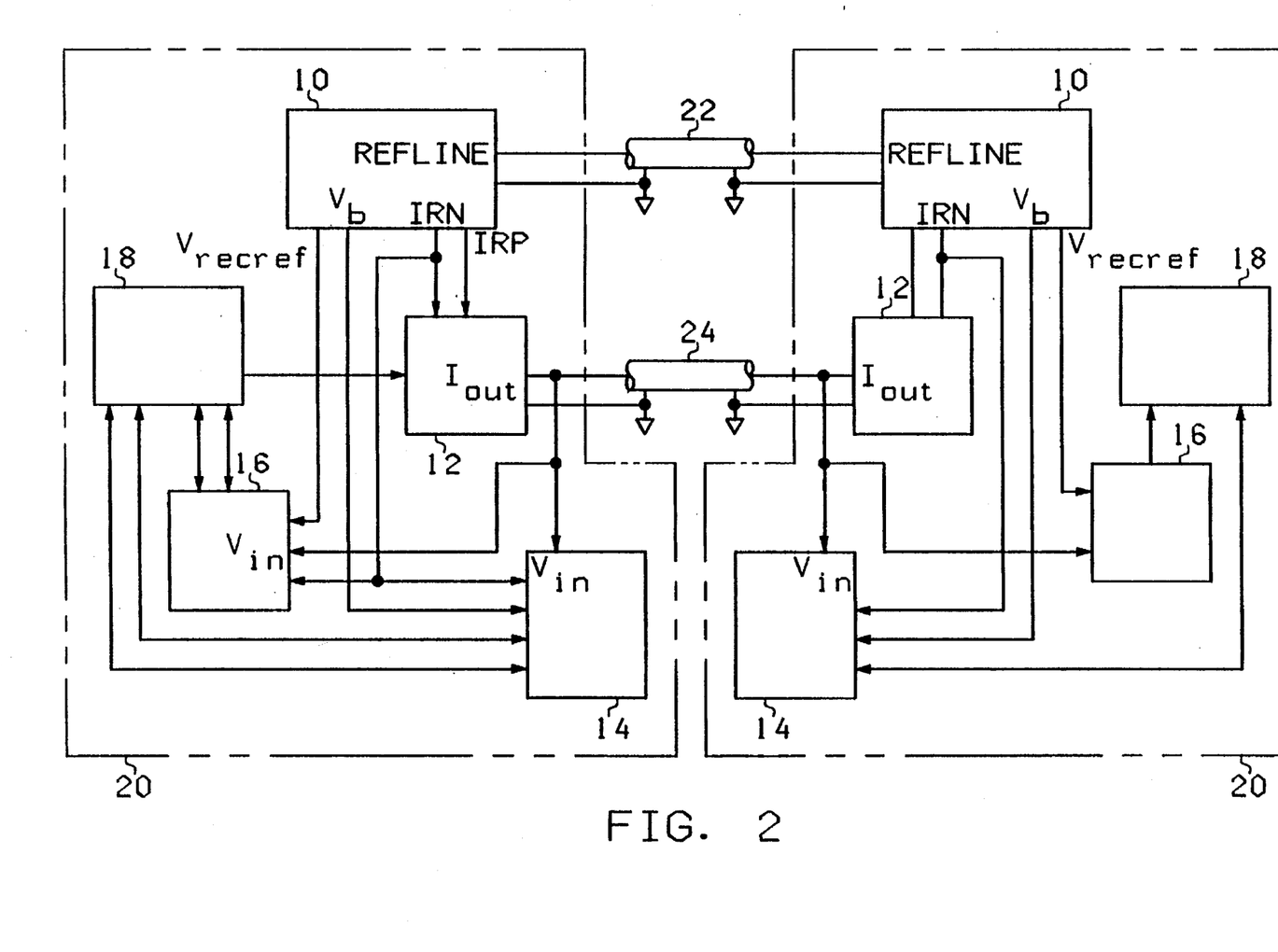
FIG. 2 is a block diagram of driver/receivers interconnected by a transmission line.

FIG. 2 shows another embodiment having the elements of the embodiment of FIG. 1 and additional elements. FIG. 2 shows reference generator 10, switched current source 12, active terminator 14, multidrop receiver 16 and logic circuit 18 in a first and second driver/receiver 20. The reference generators 10 are interconnected by a single reference line 22 with a grounded shield. The reference line 22 feeds back a common reference signal between the driver/receivers 20 which is generated by the reference generators 10. A reference generator 10 in a driver/receiver 20 also generates reference signals which are fed to the switched current source 12, active terminator 14 and receiver 16 in the driver/receiver 20. The switched current source 12, active terminator 14 and receiver 16 in a driver/receiver device 20 are connected to an end of a transmission line 24 for carrying logic signals between driver/receiver devices 20. The transmission line 24 also has a grounded shield.

The receiver 16, terminator 14 and switched current source 12 in a driver/receiver device 20 are connected to the logic circuit 18 for the device. The logic circuit 18 initiates generation of current pulses representing logic signals in the switched current source 12 for transmission over the transmission line 24 between the driver/receiver devices 20. The logic circuit 18 also receives logic signals detected by the receiver 16 or the terminator 14, from signals the receiver 16 or terminator 14 measures on the transmission line 24. The logic circuit 18 also provides mode select signals to the current source 12, receiver 16, and terminator 14, for selecting between the source 12 providing a fixed magnitude logic signal current or a current of variable magnitude which matches transmission line 24 impedance, and for switching the terminator 14 in a device 20 on or off.

The reference signals generated by the reference generator 10 control the impedance in the terminator 14, the amplitude of transmitted current pulses representing logic signals generated in the current source 12, and the amplitude of voltage pulses which the multidrop receiver 16 or terminator 14 detects as logic signals in signals received on the transmission line 24. This common reference line between the driver/receiver devices 20 allows the devices 20 to establish a common basis for the parameters controlled by the reference generators 10.

Since the logic signal current transmitted by a driver 20 is varied by the reference generator 10 in the driver 20 in accordance with the feedback mechanisms described above, the signal current or voltage which a receiver 16 or terminator 14 measures does not have a fixed magnitude. Therefore, the receiver 16 or terminator 14 uses reference signals from the reference generator 10 for comparison against the signal received on the transmission line 24 in order to determine the value of a logic signal.

Signals received by a driver/receiver 20 on the transmission line 24 may be interpreted either by a multidrop receiver 16 or by a detector in the terminator 14. As will be understood from the description of the receiver below, the receiver 16 does not load the transmission line 24. The receiver 16 is therefore useful for applications where many driver/receiver devices 20 are connected together on a transmission line 24. The terminator 14 is advantageous in that it provides a termination to the transmission line 24 which more precisely matches the impedance of the transmission line 24 so that signals can be measured with more precision. Since having a number of terminators 14 active on the transmission line 24 will load down and mismatch the transmission line 24 the invention includes provision for the logic circuit 18 to switch off the terminator 14.

Figure 3:
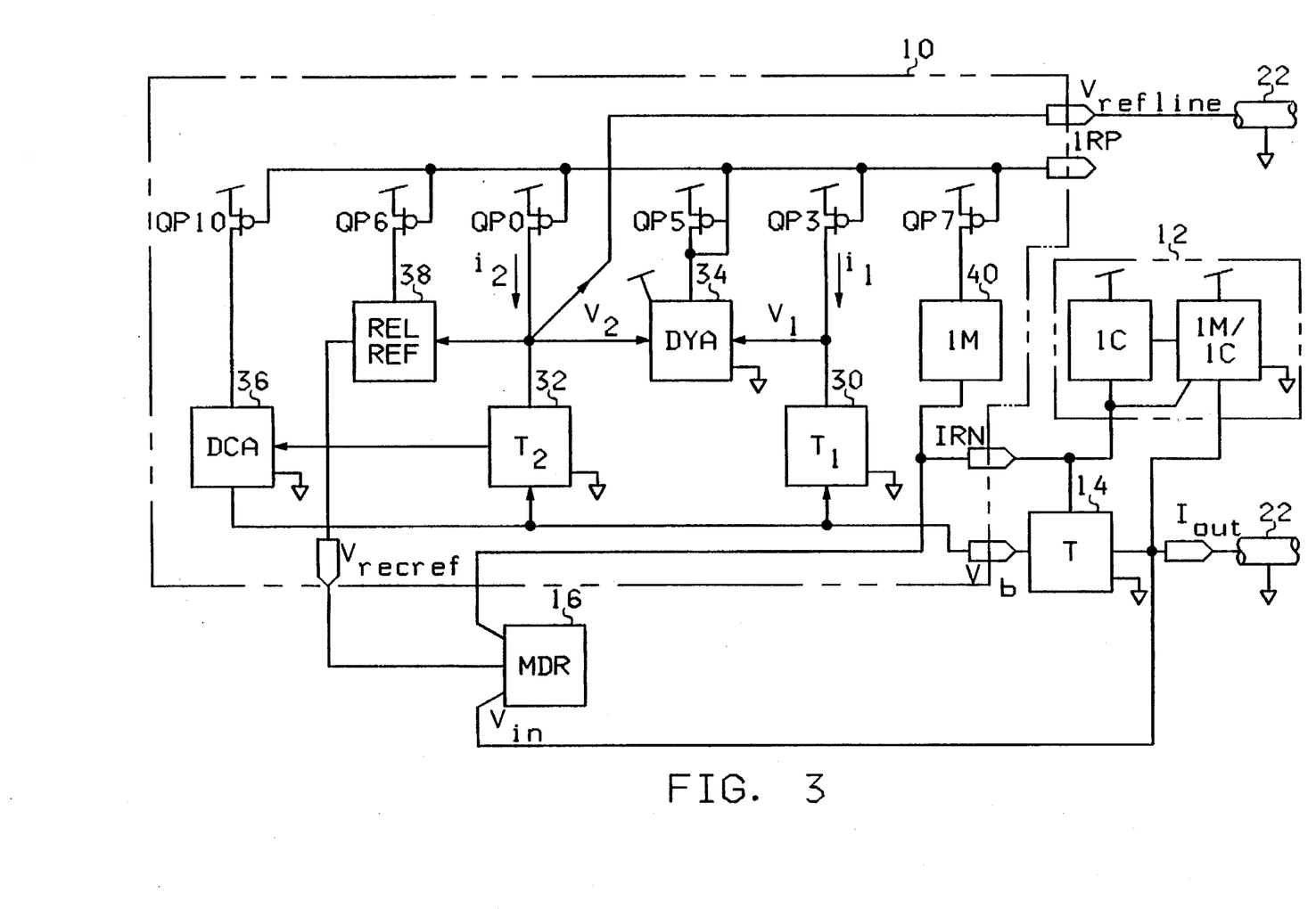
FIG. 3 is a more detailed block diagram of one of the driver/receivers.

The diagram of FIG. 3 shows another, more detailed block diagram for one of the driver/receivers 20 of FIG. 2. The reference generator 10 includes a first and second reference active terminator 30 and 32, a differential voltage amplifier 34, a differential current amplifier 36, a receiver reference voltage generator 38, and a current mirror 40. In order to focus on the operation of the devices in generating, transmitting and receiving signals, FIG. 3 omits the logic circuit 18 and logic control lines shown in FIG. 2.

The differential voltage amplifier ("DVA") 34 receives a first voltage input $V_1$ that is the voltage generated by current $i_1$ flowing through the first terminator 30, including the resistor $20Z_0$ (FIG. 5) and a second voltage input $V_2$ that is the voltage across the second terminator 32 generated by current $i_2$ flowing through the second terminator 32. The DVA 34 provides an output to the gates of FET's QP0, QP3, QP5, QP6, QP7, and QP10 along a rail labeled "IRP" (the "IRP rail FET's"). The DVA 34 output to the IRP rail sets a certain current in QP5 which is fed back to the DVA 34. An increasing voltage output from DVA causes a decreasing current in the IRP rail FET's. The FET's on the IRP rail mirror the current in QP5.

The term "mirror" applies to field effect devices which are well matched. To "mirror" a current refers to applying the same gate voltage to matched FET's and thereby causing the same drain current, or a predetermined matching scaled drain current, in the FET's. Although the value of the drain current may not be known, since the FET's match therefore it is assumed that the drain current will be matching in each FET, whatever that drain current may be.

The same principles apply to bipolar transistors so that these current mirror circuits could be configured with bipolar transistors. There are some differences between field effect and bipolar devices, but they do not prevent practicing this invention with bipolar transistors. One difference is that bipolar transistors draw a base current, whereas FET's do not draw a gate current. This makes FET's more desirable for this application. Another difference is that bipolar transistors have a flatter linear region in the drain current versus gate-to source voltage characteristic. This favors bipolar devices.

By increasing or decreasing its output voltage, DVA 34 increases or decreases currents $i_1$ and $i_2$ through the reference terminators 30 and 32 in response to any difference in the two voltage inputs to DVA so that the currents $i_1$ and $i_2$ through the terminators 30 and 32 will increase and decrease the voltages across the terminators 30 and 32. Ultimately a certain combination of the currents $i_1$ and $i_2$ produces a substantially equal voltage drop across the terminators 30 and 32 and thus satisfies the DVA 34.

The differential current amplifier ("DCA") 36 receives a first current input from the second terminator. The input is a current that mirrors the current $i_2$ set by the DVA 34, through the second terminator 32. The DCA 36 also receives a second current input from FET QP10 on the IRP rail. Since QP10 matches QP5 and QP3, and since the DVA output provides the gate voltage to QP3, QP5 and QP10, the voltage output from DVA 34 sets a current through QP10 that is the same as current $i_1$.

This current through QP10 is compared by the DCA 36 to the first current input. The DCA 36 provides an output signal that adjusts the impedance of both of the reference terminators 30 and 32 to cause all the current through QP0 to go into the second terminator 32 so that no current flows through the reference line 22 into or out of the node between QP0 and the second terminator 32.

The reference line 22 between the reference generators 10 at each end of the transmission line 24 forces each second terminator 32 on the ends of the transmission line 24 to have the same voltage drop. And, as just described, the DVA 34 in a reference generator 10 forces the voltage drop across the reference generator's first terminator 30 to substantially equal the voltage drop across its second terminator 32. Thus, both reference terminators 30 and 32 in both reference generators 10 shown in FIG. 1 have the same voltage drop.

The current mirror 40 of the reference generator 10 provides a voltage output IRN to the switched current source 12 and the receiver 16 for driving another matched FET to mirror the current $i_1$.

The switched current source 12 shown in FIG. 3 provides a bias current of magnitude $i_1$ that is set by the IRP rail voltage from the reference generator 10, and a signal current of magnitude $20i_1$ that maybe set by the current mirror 40 output voltage IRN from the reference generator 10. The signal current is switched on or off by the logic circuit 18. The logic circuit may also select to set the signal current at a fixed value rather than allowing the signal current to be set by the reference generator.

The active terminator 14 shown in FIG. 3 has a FET (not shown in FIG. 3) for terminating the transmission line 24. The bias voltage $V_b$ from the DCA 36 applied to the active terminator 14 adjusts the impedance of the terminating FET to match the impedance of the transmission line 24 at the particular current which is transmitted by the corresponding device 20 at the other end of the transmission line 24. The terminator 14 also has a detector which compares the signal current flowing in the termination of the transmission line to a reference and provides one or more outputs to the logic circuit 18 indicating the logic value of the signal current.

The receiver (or "multidrop receiver") 16 shown in FIG. 3 has a first input labelled $V_{recref}$ to which the Voltage $V_{recref}$ from the receiver reference circuit 38 is applied, a second input labelled IRN to which the voltage IRN out of the current mirror 40 of the reference generator 10 is applied, and a third input labelled $V_{in}$ to which the voltage on the transmission line 24 is applied. The signal current sent by the sender/receiver 20 is set by the feedback mechanisms in the sender/receivers such that a logic signal having a current of $20i_1$ corresponding to a logic value of 1, combined with a bias current equal to $i_1$, will generate a voltage at the third input $V_{in}$ equal to $V_1$, the same as the voltage across the reference terminators 30 and 32. The voltage $V_{in}$ will transition from a small magnitude generated by the bias current of magnitude $i_1$ when there is no current signal being sent to the receiver, to a larger magnitude $V_{final}$ when an additional current signal of magnitude $20i_1$ (corresponding to a logic signal 1) is received. When $V_{in}$ makes this transition the receiver 16 output will provide a high signal to the logic circuit 18 indicating that a logic signal 1 is received.

The reference circuit 38 generates a reference voltage $V_{recref}$ with a certain correspondence to the transmitted signal voltage. The receiver 16 uses $V_{recref}$ for comparison against the signal voltage measured by the receiver 16 on the transmission line 24 in order to determine the value of a logic signal. The receiver reference circuit 38 receives a first input, which is a current that matches the current input to the second reference terminator 32, and a second input, which is the voltage $V_2$ at the second reference terminator 32 (and which will be the same as $V_1$, the voltage at the first reference terminator 30). From these inputs, reference voltage $V_{recref}$ is generated for use by the receiver circuit 16 to set a transfer function for a logic signal received from a device 20 on the transmission line 24.

DETAILED CIRCUIT DESCRIPTION

The sender/receiver device of the present invention may be achieved by a variety of circuits, as will be apparent to those skilled in the art from the above description of the operation of the various portions of the device. The following is a description of the circuits used in the preferred embodiment of the invention. The FET's described herein generally are matching FET's. The invention is not limited to the relative scaling factors among the FET's described in the following. A variety of scaling factors may be used to achieve the results described for the sender/receiver devices. A power supply voltage of magnitude Vdd i s assumed throughout.

Figure 4:
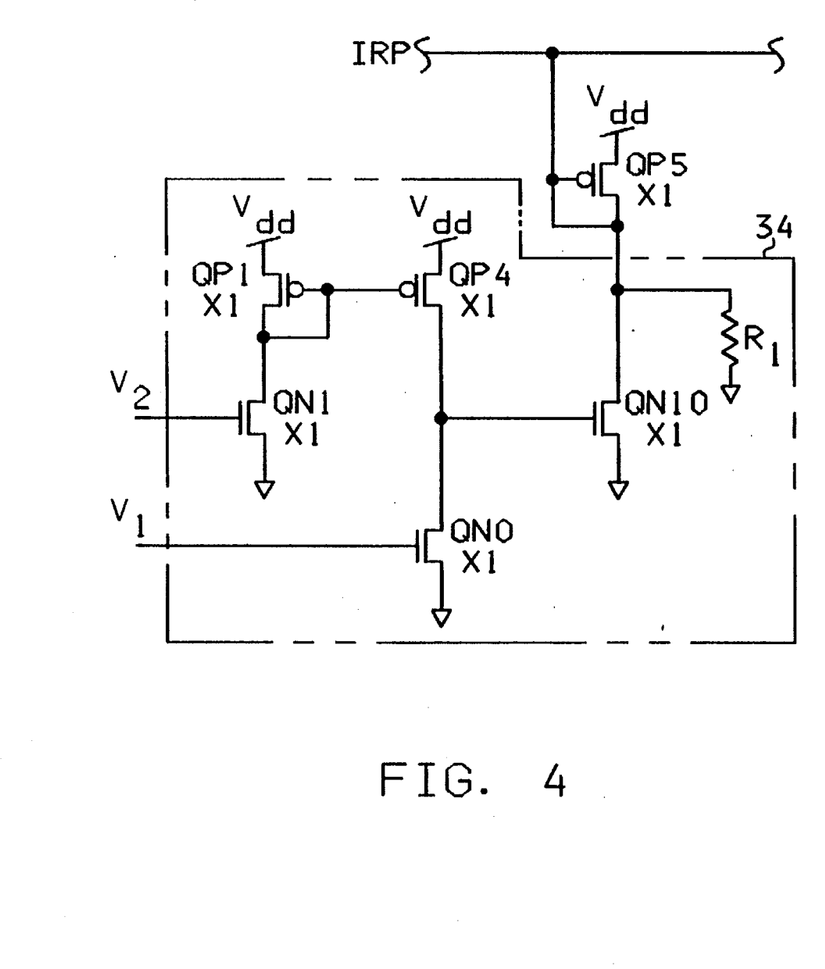
FIG. 4 is a circuit diagram for the differential voltage amplifier of the reference generator.
Figure 5:
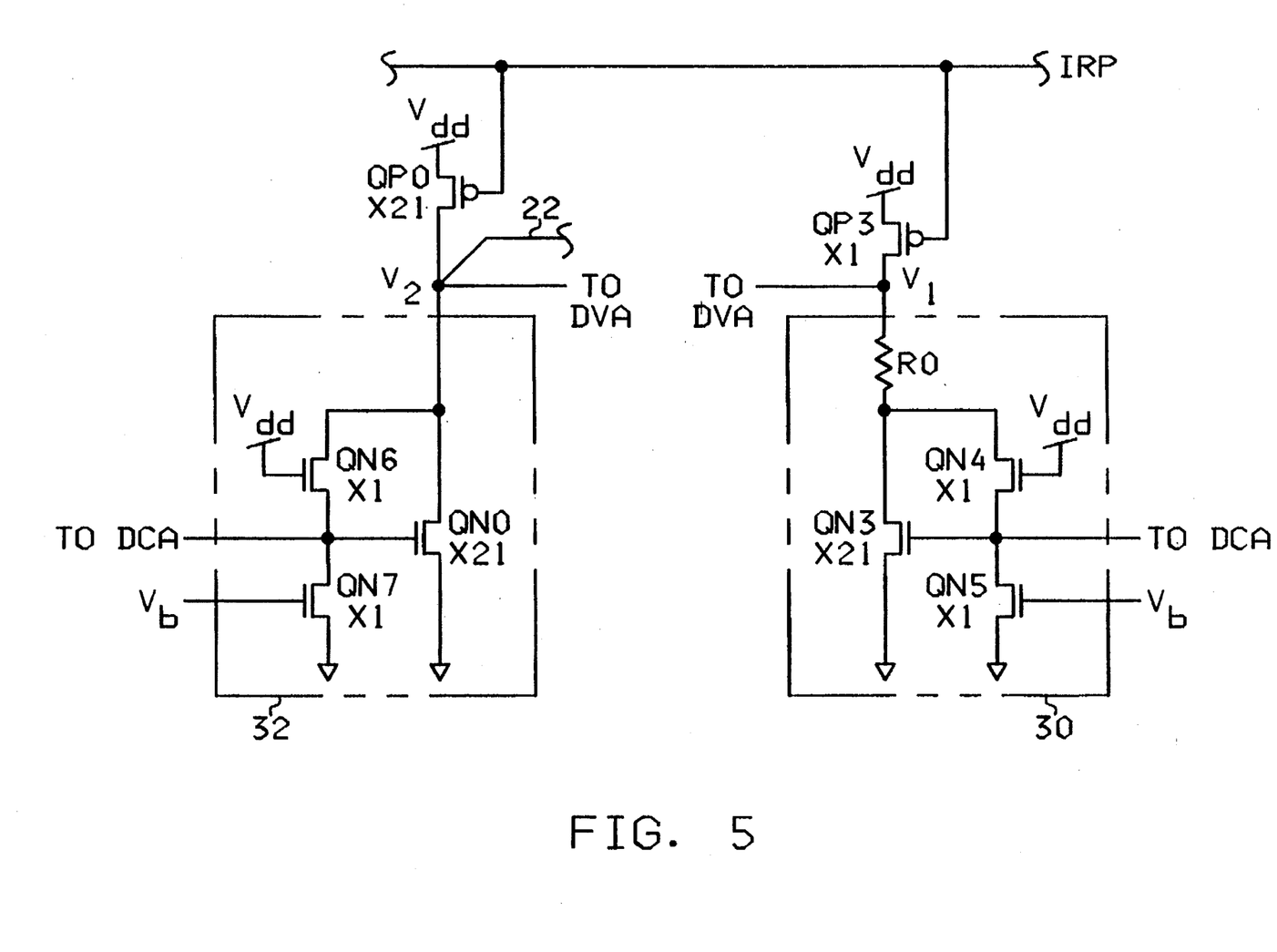
FIG. 5 is a circuit diagram for the reference terminators.

FIG. 4 shows a circuit for the DVA 34 in the preferred embodiment of the present invention. FET QP5 is connected gate-to-drain in series with FET QN10. As long as QN10 is in its linear region (i.e., above the knee of its drain current vs. gate-to-source voltage curve) QN10 acts as a current sink controlled by the QN10 gate voltage and sinks a fixed current regardless of the drain-to-source voltage drop across FET QP5. That fixed current flowing through QP5 drives the gate-to-source voltage in QP5 to whatever value is required, for the current which QP5 sources. The resulting voltage on the QP5 gate supplies the gate voltage for all the FET's on the IRP rail. To the extent that each FET on the IRP rail is operating within its linear region, since these FET's match QP5, the resulting currents through the FET's are in proportion to the current through QP5 according to their relative W/L scaling factors. Referring to FIG. 5, the matched FET's QP0 and QN0 have a W/L scaling factor of 21 so that the current $i_2$ through the second reference terminator 32 is 21 times the current $i_1$ through the first reference terminator 30. The current of magnitude $21i_1$ in the terminator 32 represents current of magnitude $20i_1$ generated by current source 12 as a logical signal 1, combined with current of magnitude $i_1$ generated by current source 12 as a bias current.

Referring again to FIG. 4, the DVA 34 has a first and second input connected so that the first input measures the voltage $V_1$ across the first reference terminator 30, and the second input measures the voltage $V_2$ across the second reference terminator 32. The first input voltage biases FET QN8 tied to the gate of FET QN10. The second input voltage biases FET QN1, which is mirrored by FET's QP1 and QP4. FET QP4 is also tied to the gate of FET QP10. Due to the configuration of the connections of the FET's QN1, QN8, QP1, QP4, and QN10 shown in FIG. 4, if $V_1$ increases, the gate voltage on QN10 decreases, and if $V_2$ increases, the gate voltage on FET QN10 increases.

FIG. 5 shows a circuit for the reference terminators 30 and 32 of the preferred embodiment. The terminators 30 and 32 are identical except that the first terminator 30 has a resistor R0 with resistance $20Z_0$, where $Z_0$ is the known transmission line 24 impedance, and the terminating FET's in the terminators 30 and 32 are scaled to be identical. Terminator 30 has a reference current of magnitude $i_1$ and terminator 32 has a current of magnitude $21i_1$. Since the terminators 30 and 32 have identical FET's and currents in this 21/1 proportion, the terminators 30 and 32 provide a static representation of two dynamic states of the transmission line. The current source 12 in a driver 20A (FIG. 1) is represented by a transient of magnitude $20Z_0i_1$ and a static bias resulting from current of magnitude $i_1$ in terminator 32. The terminator 14 in a receiver 20B (FIG. 1) is represented by a current of magnitude $21i$ in terminator 30. These two dynamic states of the transmission line 24 correspond to (1) the condition of the terminator 14 with a current of magnitude $i_1$ flowing through the terminator 14 and (2) the condition of the terminator 14 with a current of magnitude $21i$ flowing in the terminator 14. The values of the resistor R0 and the scaling factors may be varied so that for a resistor with resistance $NZ_0$, a ratio of N:1 is established between the bias current of magnitude $i_1$ and the signal current of magnitude $Ni_1$. The value of N is arbitrary, but will ordinarily be selected for convenient circuit implementation, such as N=10, N=20, etc.

Describing the second reference terminator 32 as an example, the terminating FET QN0 establishes a termination impedance. QN7 and QN6 gate the termination FET QN0 on and off, and when QN0 is on QN7 and QN6 provide a voltage divider and a bias voltage to establish the family of drain-to-source termination impedances for the drain current through the termination FET QN0. That is, within a family of impedances set by the bias voltage, for a certain drain current a certain termination impedance is set.

Figure 6:
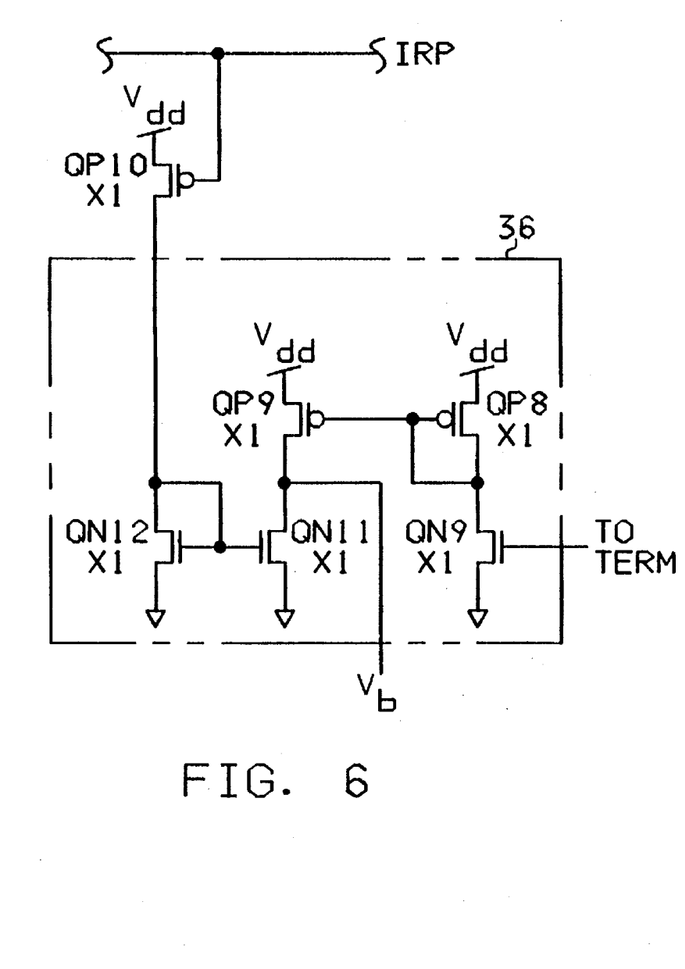
FIG. 6 is a circuit diagram for the differential current amplifier of the reference generator.

FIG. 6 shows a circuit for the DCA 36 of the preferred embodiment. The current $i_2$ through QN0 of the second reference terminator 32 (FIG. 5), scaled down by a factor of 21, is mirrored in the DCA 36 FET QN9 by matching the characteristics of QN9 and QN0, scaling down the W/L of FET QN9 in comparison to FET QN0, and connecting the gate of QN9 to the gate of QN0. Thus, QN9 will sink a scaled down currently that matches the current in QN0, and, provided that the load on the drain of QN9 must remain within a range for which QN9 operates in its linear region, QN9 will sink this current regardless of the voltage caused by the current across the load QP8.

With the gate of QP8 tied to its drain, the QN9 drain current will drive the source-to-drain voltage across QP8 to whatever value is required by QP8 to source that current, and the QP8 gate voltage will follow. The QP8 gate voltage, being connected to the gate of QP9, will set a current through QP9. Since QP9 matches QP8, the current sources by QP9 will match the current sunk by QN9.

Meanwhile, QP10 is forced by the IRP voltage, set by the DVA 34 as previously described, to source a current having a magnitude of $i_1$ because the current matches the current $i_2$ through QP0, scaled down by a factor of 21 due to matching the characteristics of QP10 and QP0, scaling down the W/L of FET QN9 in comparison to FET QN0, and connecting the gate of QP10 to the gate of QP0. With its gate tied to its drain, QN12 is forced to sink the current $i_1$ sourced by QP10, and the gate voltage of QN12 follows. QN12's gate voltage being tied to the gate of QN11 forces QN11 to sink $i_1$.

Thus, the operation of the DCA 36 may be understood as follows. FET QN0 of the second reference terminator 32 sinks (1) the current $i_2$ sourced by QP0 driving the second reference terminator 32, combined with (2) current from the reference line. Also, FET QP9 of the DCA is driven to source a current which is a scaled down match of the current which FET QN0 is sinking. And, FET QN11 is driven to sink a current which is a scaled down match of the current sourced by QP0. The only way the current sourced by FET QP9 will equal the current sunk by FEET QN11 is for FET QN0 to sink all the current which FET QP0 sources. To achieve this equivalence, the voltage $V_b$ on the drains of QP9 and of QN11 provides a feedback signal to the gate of QN7 which biases QN0 and adjusts the QN0 impedance.

Figure 8:
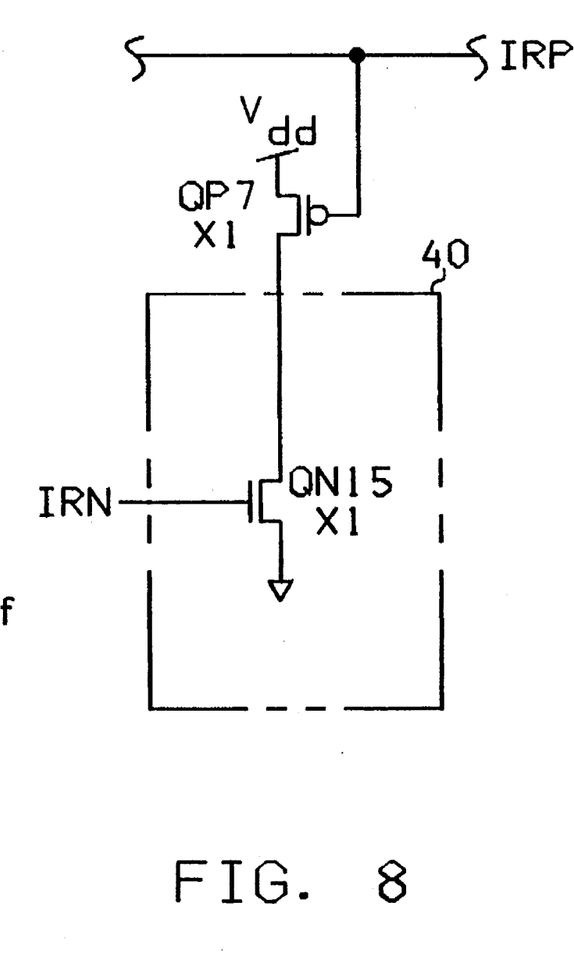
FIG. 8 is a circuit clip, gram for the current mirror of the reference generator.

FIG. 8 shows a circuit for the current mirror 40 in the reference generator 10 of the preferred embodiment. This current mirror 40 provides a voltage output IRN to the switched current source 12 of FIG. 9 and the receiver 16 of FIG. 11 for driving another matched FET to mirror the current $i_1$. The voltage output from the current mirror 40 is set by the DVA 34 output driving the matched FET QP7 on the IRP rail to source a current $i_1$. The current $i_1$ drives FET QN15 to sink $i_1$ and the FET QN15 gate voltage follows. This QN15 gate voltage is the IRN voltage output from the reference current mirror 40. Since QP7 is a p-type FET and QN15 is an n-type FET, IRP decreases and IRN increases relative to ground for an increasing $i_1$.

Figure 9:
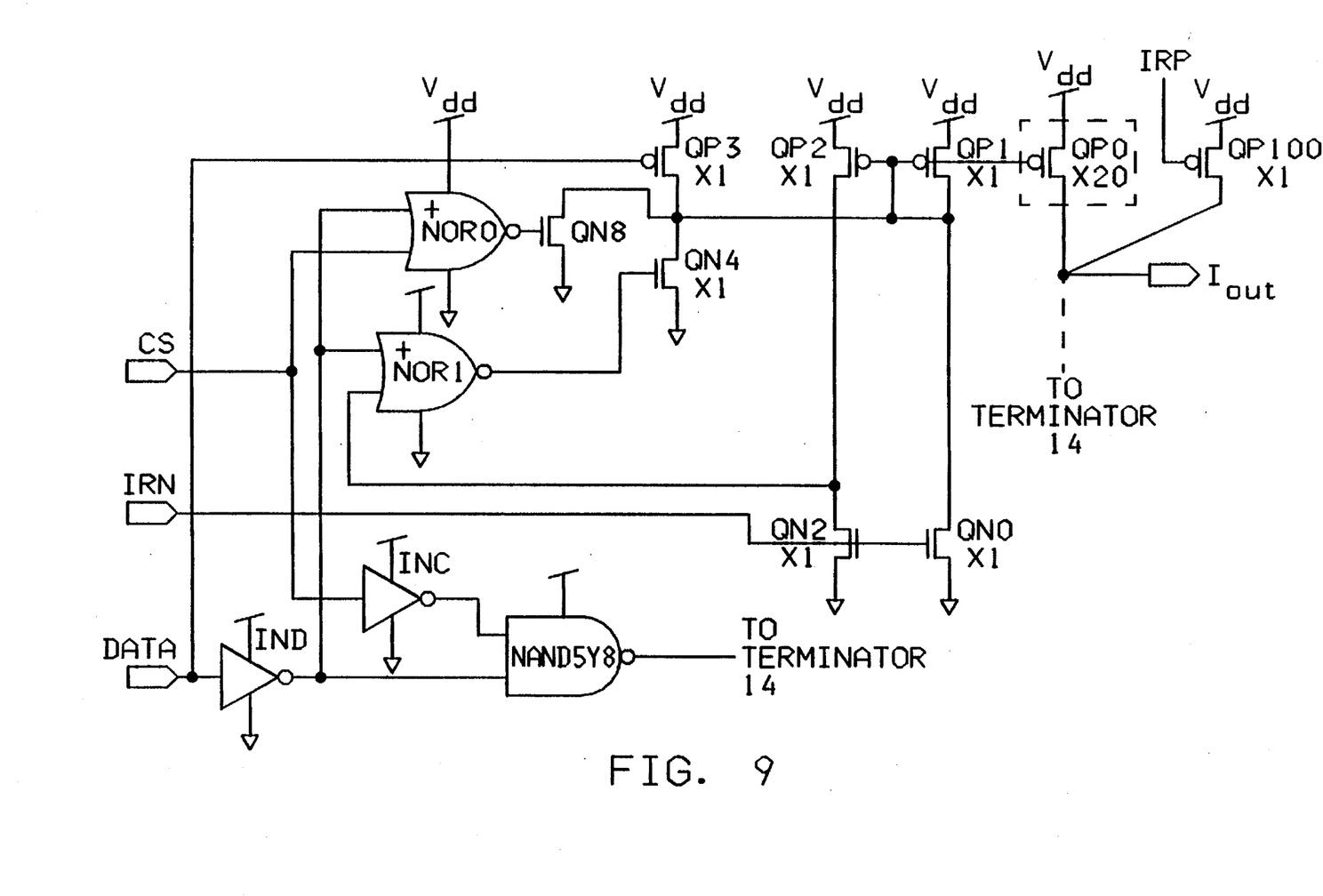
FIG. 9 is a circuit diagram for the switched current source.

FIG. 9 shows a circuit for the switched current source 12 of the preferred embodiment which mirrors the $i_1$ current set by the reference DVA 34 (FIG. 4) as controlled by the logic circuit 18. The IRN voltage output from the reference current mirror 40 (FIG. 8) drives the switched current source 12 FET QN1 to sink $i_1$. FET QP1 is forced to source a current to match the current $i_1$ sunk by QN1 since QP1 is connected to source the current sunk by QN1 and since QP1 is connected gate-to-drain. Since the gate of QP1 is tied to the gate of a FET QP0, and QP0 has matching characteristics with a 20× scale factor, QP0 mirrors a current that is twenty times $i_1$. Thus, FET QP0 provides a current of magnitude $20i_1$ which represents a logic signal 1. Also a bias current of magnitude $i_1$ is provided by FET QP100 controlled by the IRP voltage output from the reference generator 10 DVA 34.

Since QP0 is large, it has a large gate-source charging capacitance, which is slow to charge and delays the switching of QP1. Since the switching time for a FET is dependent upon the switching voltage level applied to the gate of the FET, one fast way to charge the gate-source capacitance and speed up switching time is to connect a FET gate direct to the rail. Ordinarily this is appropriate, when logic signal levels are not variable and are set at the full rail voltage. However, in the present application it is desired to vary the logic signal level to match the signal levels and impedances of the devices on the line. Therefore, the circuit shown in FIG. 9 is used to switch QP0 quickly while still setting the current which QP0 sources to a selected level which is less than a current set by the full rail voltage.

QN1 and QN2 have a constant Vgs input "IRN" from reference generator 10 (FIG. 3). IRN sets QN1 and QN2 to sink a desired current. Since QP0 proportionately mirrors the QP1 current, the current in QN1 sets the signal logic level in QP0 when QP1 sources the current sunk by QN1, provided, however that the "CS" input to gate NOR0 must remain high so that the NOR0 output remains low and QN8 therefore remains off. If the CS input to NOR0 is set low, then instead of being set by IRN the current signal sourced by QP0 will be set to a maximum by the rail voltage.

Describing now the variable current mode of operation, wherein the CS input is set high, initially, with the CS input high and current source "Data" input low, QP3 is on hard, i.e., with QP3 gate tied directly to the rail, so that QP3 sources the current for QN1 and shunts off QP0, QP1, and QP2. With QP2 off, QN2 Vd is low. Gate NOR1, with inputs QN2 Vd low and the inverted "Data" input high, thus has a low output turning off QN4.

The Data input is set high to drive QP0 to source the current set by input IRN. Data input going high immediately switches QP3 off and also forces the NOR1 output high. NOR1 output going high turns on QN4 hard. That is, the NOR1 output provides a full rail voltage to the gate of QN4 to switch QN4 faster than would occur if the lower voltage level of IRN were applied to the QN4 gate. QP0, QP1 and QP2 are thus turned on quickly through QN4, and the drain currents in QP0, QP1 and QP2 begin to increase. As the currents reach and begin to exceed the level set by IRN, the drain voltage going high on QN2 drives the NOR1 output low, turning off QN4. With QN4 no longer sinking the current in QP0, QP1 and QP2 the current stops rising and settles at the level set by the matching FET's QN1 and QN2 as determined by IRN.

Once the signal current is set high, it may be switched low by setting the Data input low. The Data input going low immediately switches QP3 on hard, which quickly turns off QP0, QP1 and QP2. Upon turning off QP2, the NOR1 input from the drain voltage on QN2 goes low.

Repeating the above analysis for the case where the CS input is set low, it will be understood that setting the CS input low causes the current source to operate rail to rail, instead of sending a selected current level determined by IRN. Initially, with the CS input low and current source "Data" input low, QP3 is on hard, i.e., with QP3 gate-tied directly to the rail, so that QP3 sources the current for QN1 and shunts off QP0, QP1, and QP2. With QP2 off, QN2 Vd is low. Gate NOR1, with inputs QN2 Vd low and the inverted "Data" input high, thus has a low output turning off QN4. Likewise, gate NOR0, with inputs CS low and the inverted "Data" input high, thus has a low output turning off QN8.

The Data input is set high to drive QP0 to source a current. Data input going high immediately switches QP3 off and also forces the NOR0 and NOR1 outputs high. NOR1 output going high turns on QN4 hard. NOR0 output going high turns on QN8 hard. QP0, QP1 and QP2 are thus turned on quickly through QN4 and QN8, and the drain currents in QP0, QP1 and QP2 begin to increase. As the currents reach and begin to exceed the level set by IRN, the drain voltage going high on QN2 drives the NOR1 output low, turning off QN4. In the variable signal current level mode of operation described above, when QN4 stops driving the current in QP0, QP1 and QP2 the current stops rising and settles at the level set by QN1 and QN2 as determined by IRN. However, in the rail to rail mode QN8 is not affected by the current level set by IRN. Instead, in the rail to rail mode QN8 stays on as long as the Data input is high, so that the current in QP0, QP1 and QP2 continues to rise to a level set by the rail voltage.

Once the signal current is set high, it may be switched low by setting the Data input low. The Data input going low immediately forces NOR0 output to go low, turning off QN8. Also, the Data input going low immediately switches QP3 on hard, which quickly turns off QP0, QP1 and QP2. Upon turning off QP2, the NOR1 input from the drain voltage on QN2 goes low.

Figure 10:
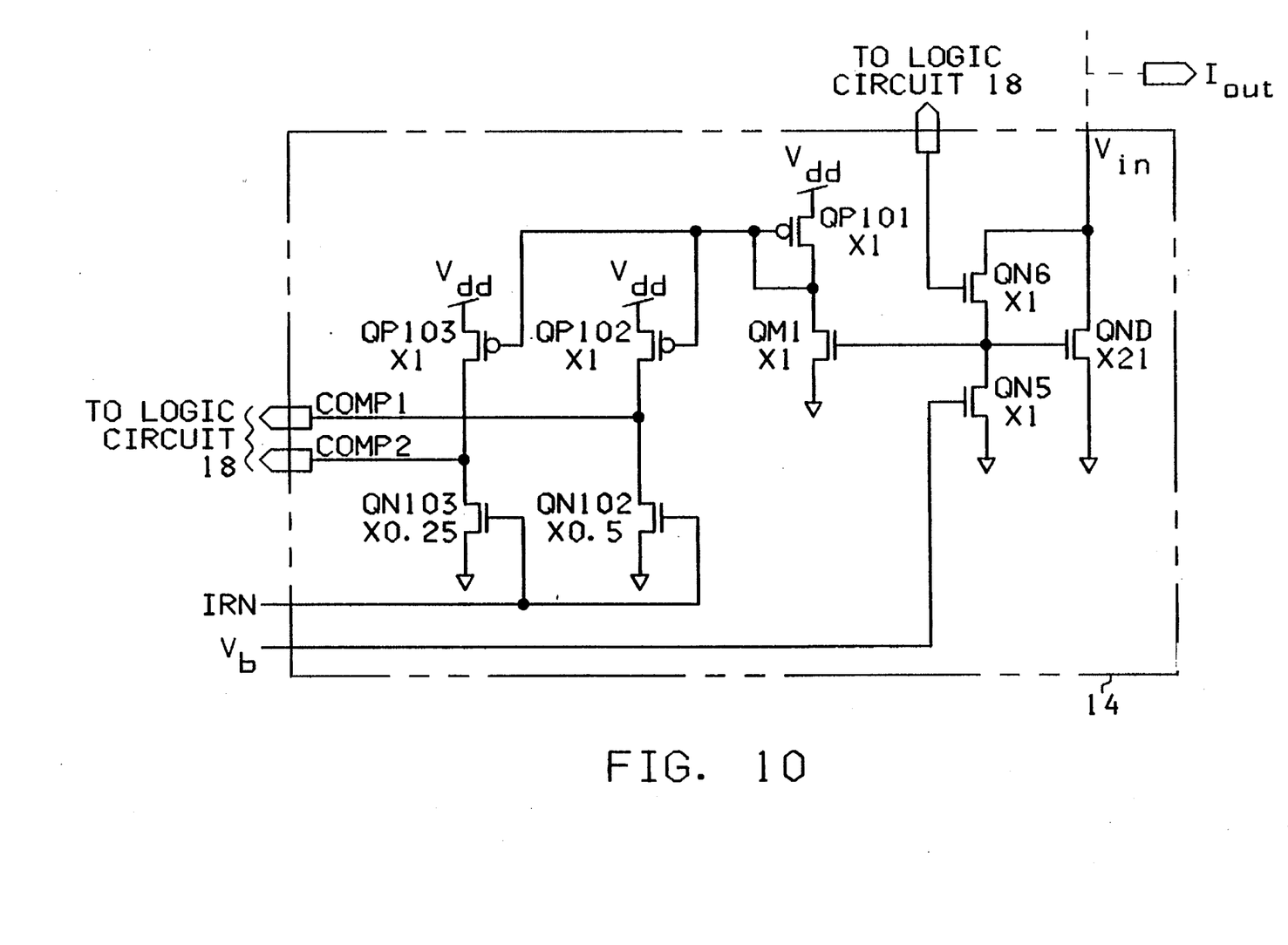
FIG. 10 is a circuit diagram for the transmission line terminator.

FIG. 10 shows a circuit for the active terminator 14 of the preferred embodiment. The active terminator 14, of receiver 20B (FIG. 1) has an FET QN0 that matches the FET QP0 of the current source 12 of driver 20A (FIG. 1) for sinking the current sourced by QP0 of the driver 20A, provided that QN0 is connected drain to gate by QN6 being turned on. FET QN5 is tied to the gate of FET QN0 and receives its gate voltage from the $V_b$ output of the DCA 36 (FIG. 6). As in the reference terminators 30 and 32 of FIG. 5, $V_b$ biases the impedance of the terminating FET. In the case of the active terminator 14 of FIG. 10, the terminating FET is FET QN0.

In the detector portion of the terminator 14, the gate of FET QM1 is connected to the gate of terminator FET QN0 to mirror the current through QN0. FET QP101 is connected to source whatever current QM1 is driven to sink, and the gate voltage of QP101 is connected to FETs QP102 and QP103 so that QP102 and QP103 also mirror the current according to their scale. QP103 and QN103 are sized so that when a current of magnitude $21i_1/2$ is sunk through QN0 of the terminator, QP103 overdrives QN103 so that QN103 drain voltage goes high. This QN103 drain voltage is used as an output to indicate that a logic signal 1 is received. QP102 and QN102 are sized so that when terminator FET QN0 sinks a current of magnitude $21i_1$, corresponding to receiving two logic 1 signals simultaneously, QP102 overdrives QN102 and QN102 drain voltage goes high. FET QN102 drain voltage is used as an output to provide an indication that two logic 1 signals have been received simultaneously.

Figure 7:
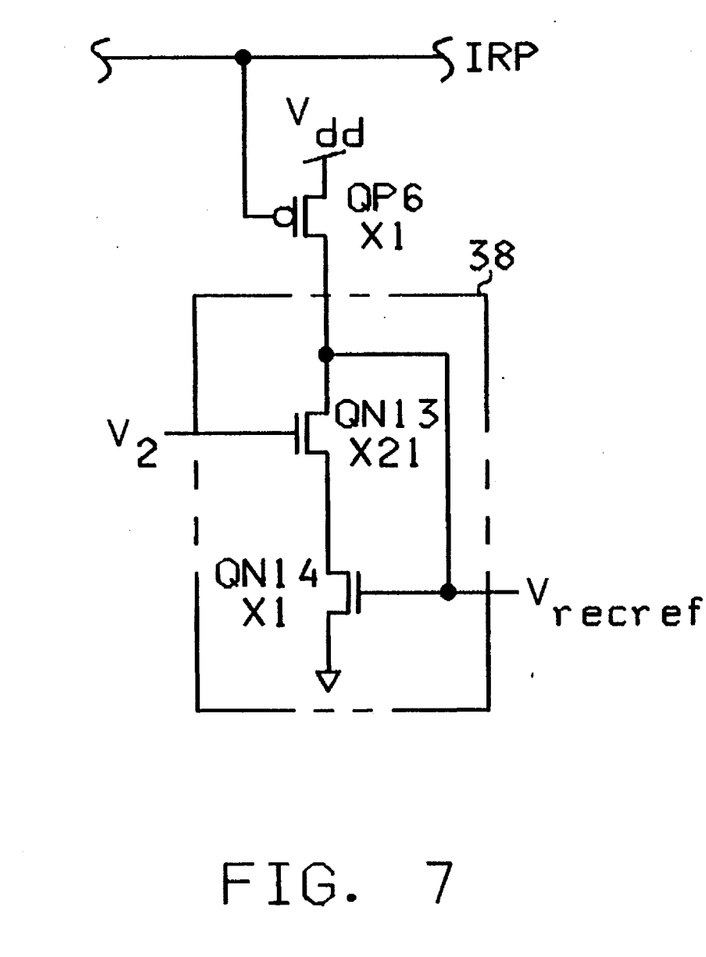
FIG. 7 is a circuit diagram for the receiver reference generator of the reference generator.

FIG. 7 shows a circuit for the receiver reference circuit 38 of the preferred embodiment. The receiver reference circuit 38 receives a current set by the DVA 34 output applied to the gate of a matched FET QP6 so that the current input $i_{rr}$ to the receiver reference circuit 38 matches the current input $i_2$ to the second reference terminator 32. The current $i_{rr}$ drives FET QN13, while at the same time the voltage $V_2$ at the second reference terminator 32, and which is applied as the second input to the DVA 34, is applied to the QN13 gate. The current $i_{rr}$ driving FET QN13 is sunk by FET QN14 connected as a cascade pair with QN13. The gate of FET QN14 is tied to the drain of QN13 and provides a reference voltage $V_{recref}$ which is the voltage required at the gate of one of the FET's of the cascade FET pair to sink current $i_{rr}$ where the voltage at the gate of the other FET of the pair is the voltage $V_2$ at the second reference terminator 32. This voltage $V_{recref}$ is used by the receiver circuit 16 to set the transfer function of QN9 and QN10, so the voltage transition on $V_{in}$ will create a known current transition through QP5. This current transition is generated to have a magnitude of $i_1$ at the transmission line 24 voltage $V_{final}$. FET's QP6 and QN11 provide a current comparator which generates a voltage of magnitude $V_{dd}$ indicating a logic signal 1 when the current in QP5 exceeds a magnitude of $i_1/2$. QN11 is sized to sink a current of magnitude $i_1/2$ at the IRN voltage.

Figure 11:
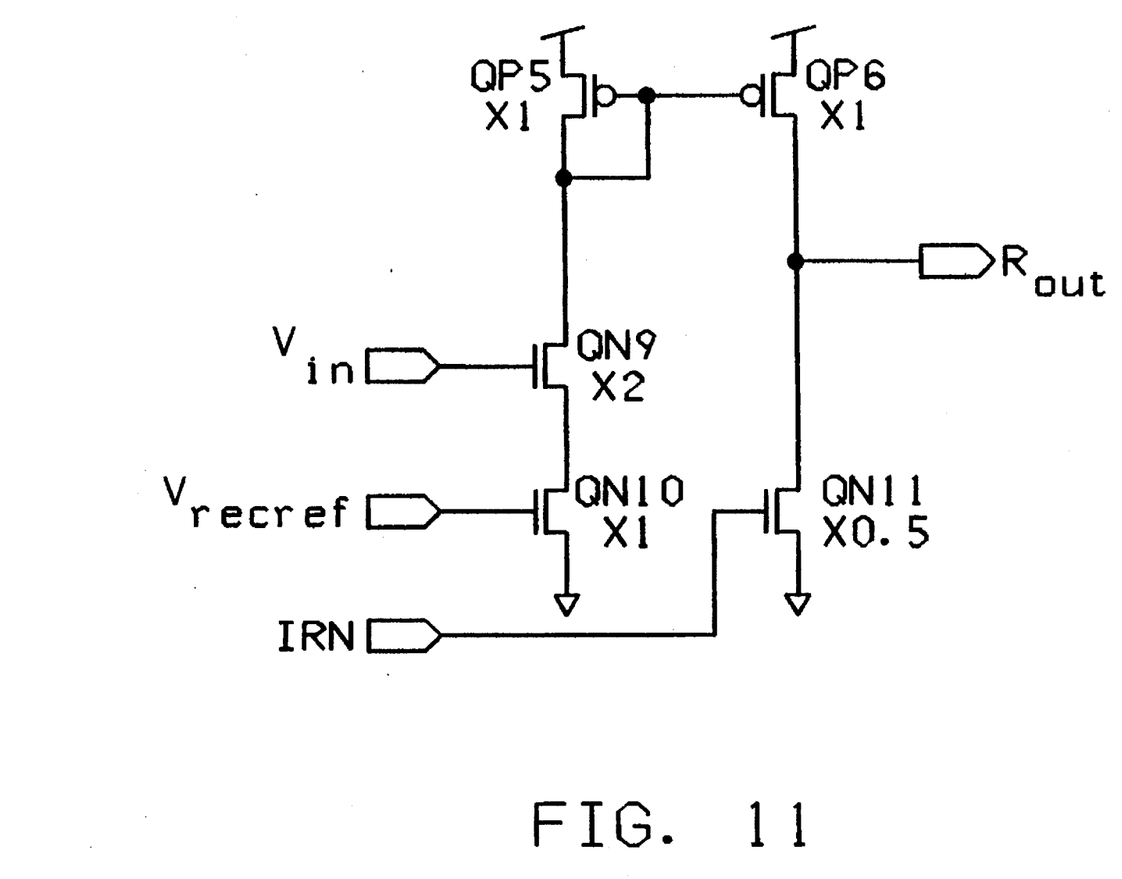
FIG. 11 is a circuit diagram for the multidrop receiver.

FIG. 11 shows a circuit for a multidrop receiver 16. The multidrop receiver 16 has a pair of FET's QN9 and QN10 which match the FET's QN13 and QN14 in the receiver reference circuit 38. The reference voltage $V_{recref}$ generated by the receiver reference circuit 38 is applied to the gate of FET QN10 in the receiver 16. The transmission line 24 voltage $V_{in}$ is applied to the gate of FET QN9 in the receiver 16. Since FET's QN9 and QN10 match the cascade pair QN13 and QN14 in the receiver reference circuit 16, and QN10 gate has $V_{recref}$ applied, FET's QN9 and QN10 will sink a current that matches current $i_1$ when the voltage applied to the gate of QN9 is the same as the voltage $V_1$ applied to the reference terminators 30 and 32. The signal current sent by the sender/receiver 20 is set by the feedback mechanisms in the sender/receivers such that a logic signal having a current of $20i_1$ corresponding to a logic value of 1, combined with a bias current equal to $i_1$, will generate a voltage equal to $V_1$ at the gate of QN9.

FET QP5 is connected in series with FET's QN9 and QN10, with the gate of QP5 connected to its drain so that QP5 sources the current that QN9 and QN10 sink. FET QP6 is connected to mirror the current sourced by FET QP5. FET QP6 is in series with an FET QN11 which is driven by the voltage out of the current mirror 40 of the reference generator 10. FET QN11 is scaled to sink a current of magnitude $0.5i_1$ when driven by a gate voltage from the current mirror 40 that corresponds to a current of magnitude $i_1$ in the current mirror 40.

The voltage $V_{in}$ will transition from a small magnitude generated by the bias current of magnitude $i_1$ when there is no current signal being sent to the receiver 16, to a larger magnitude (referred to as $V_{final}$) when an additional current signal of magnitude $20i_1$ (corresponding to a logic signal 1) is received. When $V_{in}$ makes this transition QP6 will overdrive QN11 and the voltage on the node between QP6 and QN11 will drive to $V_{dd}$. This node voltage is an output Rout, and provides a detector signal to logic circuit 18 that indicates a logic signal 1 is received by the receiver 16.

The theory of operation is as follows. The DVA 34 (FIG. 3) sets reference currents of magnitude $i_1$ through the first reference terminator 30 and, if the transmission line terminator 14 is switched on, as a bias current through the transmission line terminator 14 terminating FET QN0 (FIG. 10). DVA 34 also sets a current of magnitude $20i_1$ as the signal current through the current source 12 FET QP0 (FIG. 9). This current $20i_1+i_1$ is sent onto the transmission line 24 and, if the terminator 14 is on, the current divides between the terminator 14 and the transmission line 24. DVA 34 also sets a current of magnitude $21i_1$ into the node between the second reference terminator 32 and the reference line 22. The value of the current $i_1$ is set by the DVA 34 such that the currents into the reference terminators 30 and 32 produce voltage drop that are substantially equal.

Meanwhile, the DCA 36 (FIG. 3) sets a bias voltage Vb applied to the reference terminators 30 and 32 and the transmission line terminator 14, which affects the transconductance (and the impedance) of termination FET's QN0 and QN3 in the first and second reference terminators and the termination FET QN0, in the transmission line terminator 14 (FIG. 10) such that the current of magnitude $21i_1$ set by the DVA flows into second reference terminator 32 (i.e., no current flows into the reference line 22).

DVA 34 and DCA 36 interact, in that the current magnitudes set by DVA 34 affects the current that flows into the reference terminators 30 and 32 to which the DCA 36 responds, while the bias voltage set by DCA 36 affects the voltage across the reference terminators 30 and 32 to which the DVA 34 responds. The interaction of the DVA 34 and the DCA 36, together with the matching characteristics of the FET's in the devices 20 and the selection of scaling factors for the FET's and resistors in the devices 20, forces an equilibrium wherein the reference current $i_1$ and the transconductance of FET QN0 satisfies the equation:

$$20i_1 Z_0 + \sqrt{\frac{i_1}{K\frac{W}{L}}} = \sqrt{\frac{21i_1}{K\frac{W}{L}}}$$

which results in matching the impedance of the transmission line 24 with that of the transmission line terminator 14 terminating FET QN0 with a current of magnitude $21i$ flowing in the FET QN0.

A variable level bias current may be sourced by QP100, as set by IRP from ref. gen. 10 (FIG. 3). When switched on, the variable level signal current sourced by QP0 is combined with the bias current at the transceiver/line node (labelled $I_{out}$ in FIG. 9). Referring now to FIG. 1, if there is no enabled transmission line terminator 14 in a sending device 20A with a current source 12, then all of the combined current is sent onto the line 24 for a receiving device 20B thereon. Referring to FIG. 2, if there is an enabled transmission line terminator 14, then the combined current at the transmitting device 20A divides, a portion of the current being delivered onto the line and a remaining portion being delivered to the terminator 14 (not shown) at the transmitting device 20A. Regardless of whether a transmission line terminator 14 is included in any particular embodiment of the invention, or whether any such terminator 14 is enabled, a multidrop receiver 16 may be included in each transceiver, since the receiver 16 is connected to the line by its FET QN9 gate, and therefore does not load the line.

With terminating FET's QN0 in terminators 14 in each of two devices 20A and 20B on the line 24, and with the terminating FET's having impedances adjusted for the line impedance and the level of transmission currents, the current at a transmitting device 20 divides equally between the terminator 14 and the line 24. Thus, with one half of a transmitted current being sent from a first device 20A to a second device 20B, and one half being delivered to the first device 20A's own terminator 14, and with one half of a transmitted current being sent from a second device 20B to a first device 20A, and one half being delivered to the second device 20B's own terminator 14, when both devices 20A and 20B send a certain equal level of current, say $21i_1$, a device's terminator 14 will receive that level, $21i_1$. When only one device 20 sends a current $21i$, each device 20 receives $0.5*21i_1$, regardless of which device 20 sends. And, of course, when neither device 20 sends a signal current, then only a bias current of $0.5i_1$ is received by each device 20.

Referring now to FIG. 10, the terminating FET QN0 of the transmission line terminator 14 is switched in and out of the circuit by a logic signal to the gate of QN6. With QN6 turned off (as controlled by logic circuit 18 in FIG. 2) QN0 is turned off, unloading the line and disabling the terminator 14. With QN6 turned on, the terminator 14 is enabled and QN0 provides a variable impedance sink set by bias voltage Vb to the gate of QN5 for sinking a current applied at the transceiver/line node ("$I_{out}$" in FIG. 10). The current received by QN0 is mirrored to FET QM1 and converted to logical data by the detector circuit formed by FET's QM1, QP101, QP102, QN102, QP103, and QN103 as described elsewhere herein so that both of the COMP1 and COMP2 outputs is high when a current of level $21_i$ is received, one output is high when a current of level $0.5*21_1$ is received, and neither output is high when no current is received. This data may be combined with data from the receiving device indicating whether the device transmitted a portion of the received signal in order to determine what portion of the received signal was transmitted externally. This may be expressed in a table as follows:

| RECEIVED CURRENT | TRANS-MITTING | COMP1 | COMP2 | RECEIVED LOGIC VALUES |
| --- | --- | --- | --- | --- |
| $21_i$ | Y | H | H | 1 |
| $21_i/2$ | Y | L | H | 0 |
| $21_i/2$ | N | L | H | 1 |
| $0_i$ | N | L | L | 0 |

As the above analysis illustrates, according to the present invention two transceivers 20 with enabled transmission line terminators 14 may simultaneously transmit and receive data between the two transceivers 20 over a single line 24. And, also according to the present invention, the terminating impedance of a first transceiver 20, and the level of current $I_{out}$ for a logic signal, may be controlled to match the line 24 impedance, and the terminating impedance and logic current level of a second transceiver 20 using solely a single reference line 22. And, regardless of whether an enabled transmission line terminator 14 is included, the mode of operation of the current source 12 of the present invention may be selected as a rail to rail current driving mode or a mode having variable current level. In the variable mode, the signal level of a number of transceivers 20 may be matched, using solely a single reference line 22 between the devices 20.

What is claimed is:

1. Circuitry for generating and receiving digital signals over a transmission line in response to digital data input and control signals, comprising:

a reference circuit providing a first and second reference signal;

a signal source connected to the transmission line for generating a variable level digital signal;

an output reference level adjusting and switching circuit responsive to the digital data input and the first reference signal and connected to the signal source for selecting the level of the variable level digital signal and switching the signal source between a first and second output state so that the signal source generates a digital signal to the transmission line which follows the digital data input at the selected output signal level;

a variable input impedance circuit connected to the transmission line responsive to the second reference signal for receiving variable level digital signals from the transmission line; and a detecting circuit connected to receive the variable level digital signals from the variable input impedance circuit, the detecting circuit being responsive to the first reference signal, for detecting logic states of the variable level digital signals as determined by the first reference signal, and for converting the detected logic states into corresponding logic signals of predetermined output levels.

2. The circuitry of claim 1 wherein the output reference level adjustment and switching circuit speeds up switching of the signal source while maintaining the signal source digital output signal at a level not exceeding that set by the first reference signal.

3. The circuitry of claim 1 wherein the output reference level adjusting and switching circuit provides a switching signal for the switching of the signal source, and boosts the switching signal during an initial switching interval to a level greater than that set by the first reference signal, the switching speed of the signal source being dependent upon the level of the switching signal applied to the signal source, so that the boosted switching signal increases the switching speed of the signal source.

4. The circuitry of claim 3 wherein following the initial switching stage the level of the switching signal conforms to the first reference signal so that the signal source digital output signal does not exceed the level set by the first reference signal.

5. The circuitry of claim 2 further comprising an output level override circuit connected to the reference level adjustment and switching circuit which, in response to the digital control signal, overrides the selected output signal level set by the first reference adjustment signal so that the output signal is instead set at a certain predetermined maximum level.

6. The circuitry of claim 2 wherein the reference circuit also provides a third reference signal, and the circuitry further comprises:

a fixed input impedance circuit connected to the transmission line for receiving the variable level digital signals from the transmission line;

second detecting circuit connected to receive the variable level digital signals from the transmission line, the second detecting circuit being responsive to the first and third reference signals, for detecting logic states of the variable level digital signals as determined by the first and third reference signals, and for converting the detected logic states into corresponding logic signals of predetermined output levels.

7. The circuitry of claim 6 wherein the variable impedance circuit further comprises a disabling switch responsive to one of the control signals for switching the variable input impedance circuit to a disabled mode having a high input impedance.

8. Circuitry for generating digital signals over a transmission line in response to digital data input and control signals, comprising:

a reference circuit providing a reference signal;

a signal source connected to the transmission line for generating a variable level digital signal; and an output reference level adjusting and switching circuit responsive to the digital data input and the reference signal and connected to the signal source for selecting the level of the variable level digital signal, switching the signal source between a first and second output state so that the signal source generates a digital signal to the transmission line which follows the digital data input at the selected output signal level, and for speeding up switching of the signal source while maintaining the signal source digital output signal at a level not exceeding that set by the reference signal.

9. Circuitry for generating digital signals over a transmission line in response to digital data input and control signals, comprising:

a reference circuit providing a reference signal;

a signal source connected to the transmission line for generating a variable level digital signal;

an output reference level adjusting and switching circuit responsive to the digital data input and the reference signal and connected to the signal source for selecting the level of the variable level digital signal, and switching the signal source between a first and second output state so that the signal source generates a digital signal to the transmission line which follows the digital data input at the selected output signal level; and an output level override circuit connected to the reference level adjustment and switching circuit which, in response to the digital control signal, overrides the selected output signal level set by the reference adjustment signal so that the output signal is instead set at a certain predetermined maximum level.

10. Circuitry for generating digital signals over a transmission line in response to digital data input and control signals, comprising:

a reference circuit providing a reference signal;

a signal source connected to the transmission line for generating a variable level digital signal;

an output reference level adjusting and switching circuit responsive to the digital data input and the reference signal and connected to the signal source for selecting the level of the variable level digital signal, and switching the signal source between a first and second output state so that the signal source generates a digital signal to the transmission line which follows the digital data input at the selected output signal level; and wherein the output reference level adjusting and switching circuit provides a switching signal for the switching of the signal source, and boosts the switching signal during an initial switching interval to a level greater than that set by the first reference signal, the switching speed of the signal source being dependent upon the level of the switching signal applied to the signal source, so that the boosted switching signal increases the switching speed of the signal source.

11. The circuitry of claim 10, wherein following the initial switching stage the level of the switching signal conforms to the reference signal so that the signal source digital output signal does not exceed the level set by the reference signal.

12. Circuitry for receiving digital signals over a transmission line comprising:

a reference circuit providing a first and second reference signal;

a variable input impedance circuit connected to the transmission line responsive to the second reference signal for receiving variable level digital signals from the transmission line; and a detecting circuit connected to receive the variable level digital signals from the variable input impedance circuit, the detecting circuit being responsive to the first reference signal, for detecting logic states of the variable level digital signals as determined by the first reference signal, and for converting the detected logic states into corresponding logic signals of predetermined output levels.

13. The circuitry of claim 12 wherein the reference circuit also provides a third reference signal, and the circuitry further comprises:

a fixed input impedance circuit connected to the transmission line for receiving the variable level digital signals from the transmission line;

second detecting circuit connected to receive the variable level digital signals from the transmission line, the second detecting circuit being responsive to the first and third reference signals, for detecting logic states of the variable level digital signals as determined by the first and third reference signals, and for converting the detected logic states into corresponding logic signals of predetermined output levels.

14. The circuitry of claim 13 wherein the variable impedance circuit further comprises a disabling switch responsive to one of the control signals for switching the variable input impedance circuit to a disabled mode having a high input impedance.

15. A method for generating and receiving digital signals over a transmission line in response to digital data input and control signals, comprising:

providing a first and second reference signal;

generating a variable level digital signal by a signal source connected to the transmission line;

selecting the level of the variable level digital signal for the signal source by an output reference level adjusting and switching circuit adjusting the signal source output level in response to the first reference signal;

switching of the signal source between a first and second output state by the output reference level adjusting and switching circuit in response to the digital data input so that the signal source provides a digital signal to the transmission line which follows the digital data input at the selected output signal level;

receiving variable level digital signals from the transmission line by a variable input impedance circuit;

adjusting an input impedance for the received digital signals the variable input impedance circuit responding to the second reference signal; and detecting logic states of the variable level digital signals as determined by the first reference signal, and converting the detected logic states into corresponding logic signals of predetermined output levels by a detecting circuit receiving the variable level digital signals from the variable input impedance circuit and responding to the first reference signal.

16. The method of claim 15 further comprising the step of:

boosting, only during an initial switching interval, of a switching signal in the output reference level adjusting and switching circuit to a level greater than that set by the first reference signal so that the switching signal switches the signal source between the first and second output state at an increased switching speed while maintaining the signal source digital output signal at a level not exceeding that set by the first reference signal.

17. The method of claim 16 further comprising the step of: overriding the selected output signal level set by the first reference adjustment signal in response to the digital control signal by an output level override circuit connected to the reference level adjustment and switching circuit so that the output signal is set at a certain predetermined override level instead of the level set by the first reference signal.

18. The method of claim 17 further comprising the steps of:

providing a third reference signal;

receiving the variable level digital signals from the transmission line by a fixed input impedance circuit;

detecting logic states of the variable level digital signals as determined by the first and third reference signals, and converting the detected logic states into corresponding logic signals of predetermined output levels by a second detecting circuit connected to receive the variable level digital signals from the transmission line responding to the first and third reference signals.

19. The method of claim 18 further including the step of:

increasing the input impedance by the variable input impedance circuit switching, in response to the control signal, to a disabled mode.

* * * * *